United States Patent [19]
Aono

[11] Patent Number: 4,527,382
[45] Date of Patent: Jul. 9, 1985

[54] MOWING ROTARY SAWTOOTHED CUTTER
[76] Inventor: Toshio Aono, 2185-2, Fukui, Miki-shi, Hyogo-ken, Japan
[21] Appl. No.: 519,571
[22] Filed: Aug. 2, 1983
[51] Int. Cl.³ ............................................ A01D 55/18
[52] U.S. Cl. ........................................ 56/295; 30/347
[58] Field of Search ................... 56/295; 30/347, 276, 30/206

[56] References Cited
U.S. PATENT DOCUMENTS

| | | | |
|---|---|---|---|
| 3,482,380 | 12/1969 | Stair | 56/295 |
| 4,250,622 | 2/1981 | Houle | 56/295 |
| 4,368,610 | 1/1983 | Aono | 56/295 |

Primary Examiner—Jay N. Eskovitz
Attorney, Agent, or Firm—Armstrong, Nikaido, Marmelstein & Kubovcik

[57] ABSTRACT

A mowing rotary sawtoothed cutter adapted to be attached to a mower for mowing or cutting grass, shrubs or trees, which comprises a thin disk having a central hole, and a suitable number of triangular small cutting blades disposed around the outer periphery of the disk and having cutting edges extending from the apex of the triangle along the both lateral edges thereof, half of the small cutting blades facing in one direction and the residual half of the small cutting blades facing in the other direction. In a preferred embodiment, the cutter includes a plurality of large cutting blades in the form of a rectangle or the like having cutting edges on the opposite lateral edges thereof, and a series of the small cutting blades facing one direction and a series of the small cutting blades facing the other direction are disposed in opposed relation to each other between the large cutting blades. The cutter of the invention has the feature that at the same time as the cutting edges on one side perform mowing or cutting, the cutting edges on the other side are sharpened by hard substances scattered around or sticking to the rhizomes of grass and shrubs, thereby allowing turned-over use of the cutter several times, thus the use-life without manual sharpening is greater than 10 times that of a conventional cutter.

5 Claims, 11 Drawing Figures

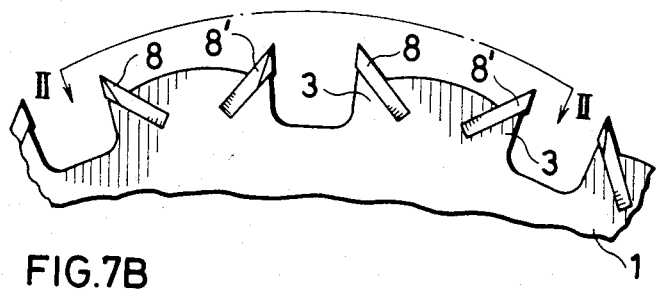
FIG.7A
FIG.7B
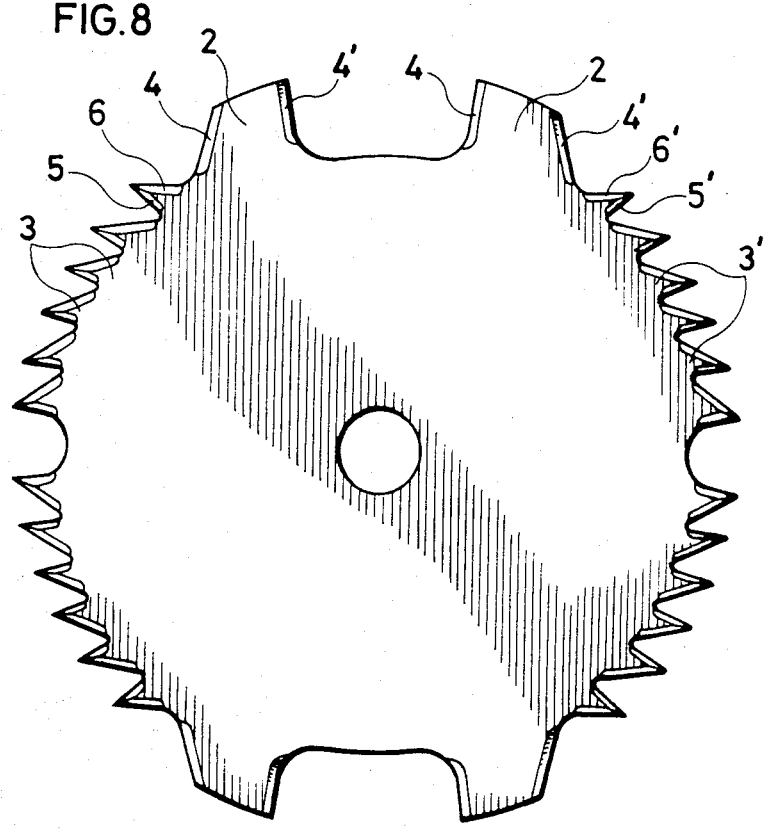
FIG.8

MOWING ROTARY SAWTOOTHED CUTTER

The present invention relates to a mowing rotary sawtoothed cutter adapted to be attached to a mower for mowing grass and shrubs. More particularly, the present invention relates to a mowing rotary sawtoothed cutter wherein small cutting blades are disposed in opposed relation to each other between large cutting blades while maintaining the tips of the small cutting blades on the circumference of a concentric circle whose radius is smaller than that of the outermost circle of the large cutting blades, each small cutting blade having cutting edges formed on its opposite lateral edges.

Most of conventional mowing cutters have a use-life of 1 to 2 hours, and no consideration has been given to reductions in sharpness of the mowing cutters due to their wear. Thus, users have long been calling for a mowing cutter that can be used for many hours without having to be sharpened. Conventional mowing cutters have been designed by giving consideration to reductions in sharpness of the cutting edges due to mowing only grass and shrubs, so that it has been impossible for the cutters to resist wear due to hard substances. In reality, mowing cutters can be worn away more severely by hard substances than by grass and shrubs. Mowing cutters will be reduced in sharpness much more greatly as they are damaged or worn by contact with hard substances such as gravel, dust, rock fragments, masses of concrete and the like scattered around or sticking to the rhizomes of grass and shrubs. In other words, mowing grass and shrubs is an auxiliary cause of sharpness reduction, while wear due to contact with hard substances is the main cause.

It is an object of the present invention to provide a mowing rotary sawtoothed cutter, wherein wear or abrasion due to contact between hard substances and the cutting blades is utilized so that at the same time as the cutting edges facing in one directin begin to mow, the cutting edges facing in the other direction are sharpened, and the working edges are protected from damage by hard substances, whereby the sharpness is maintained for a longer period of time and mowing efficiency and safety are greatly increased.

The above and other objects and advantages of the present invention will become apparent from the following description with reference to the accompanying drawings.

FIG. 7A is a partial plan view of another embodiment of a cutter for cutting trees and mowing grass and shrubs, wherein cemented carbide chips are welded in position to serve as cutting edges, and FIG. 7B is a side view thereof; and FIG. 8 is a plan view showing still another embodiment of a cutter of the invention for exclusive use for mowing grass.

Figure 1:
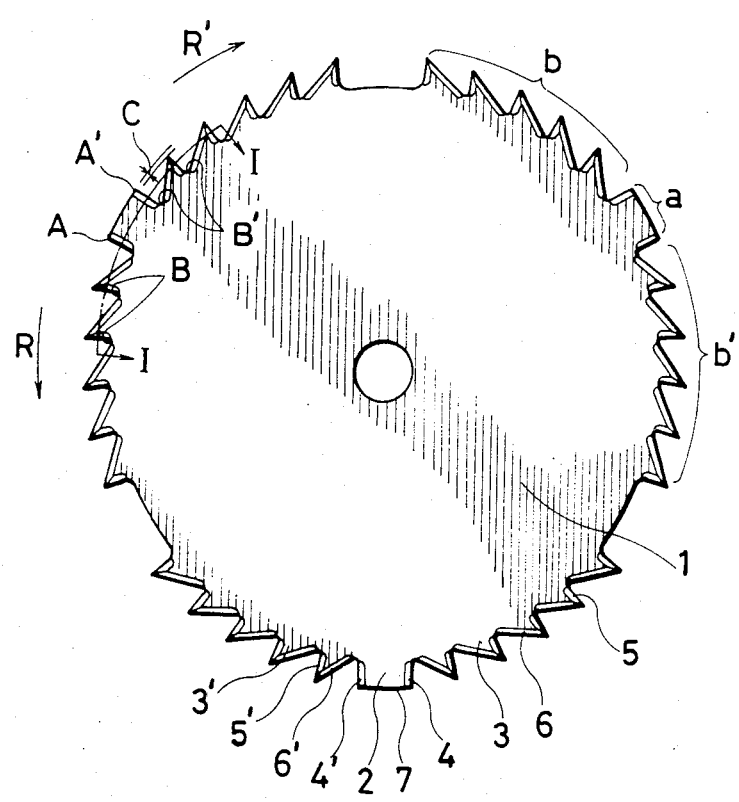
FIG. 1 is a plan view showing an embodiment of the present invention wherein a cutter for exclusive use for mowing grass has large cutting blades at three places.
Figure 2A:
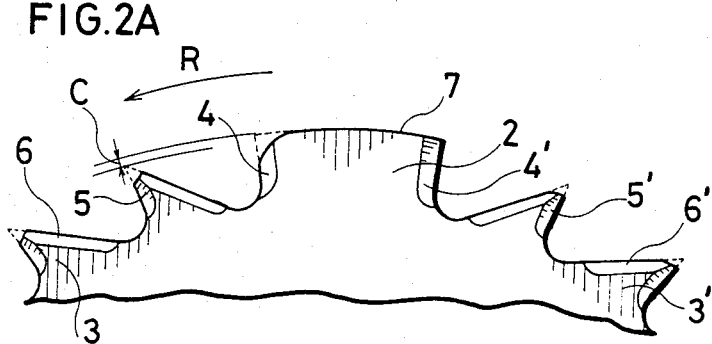
FIGS. 2A and 2B are explanatory views showing changes in wear due to hard fine particles based on the basic theory of the invention.
Figure 2B:
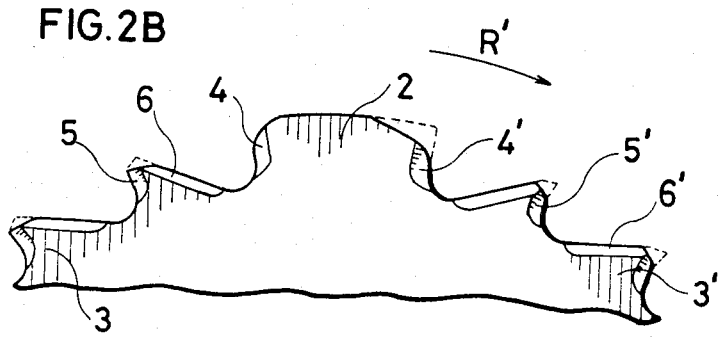
Figure 3:
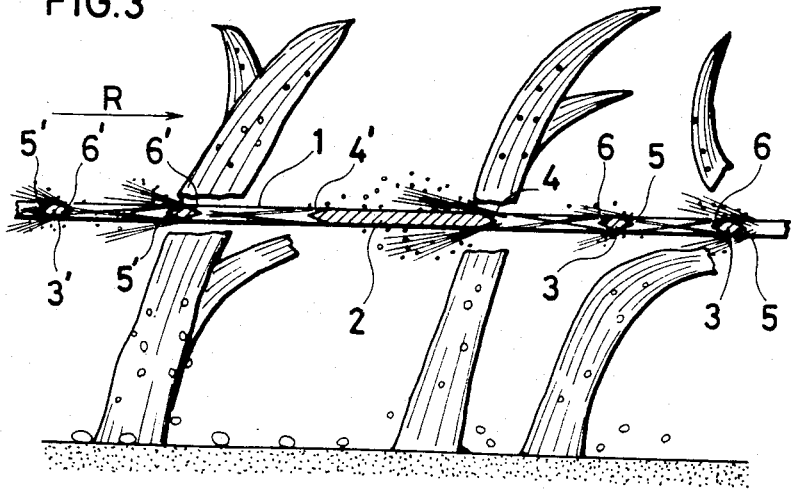
FIG. 3 is a sectional view of a portion of a cutter taken along the line I—I of FIG. 1, showing wear of the upper and lower surfaces of cutting edges.

The theory and embodiments of the present invention will now be described in detail with reference to the drawings. FIG. 1 shows a basic mowing cutter according to the present invention. The center hole of a thin disk 1 which is made of steel or a chemically synthesized material such as ceramic, is a hole for attachment to the driving shaft of a mower, and the outer periphery of the disk 1 is provided with a plurality of large cutting blades 2 in the form of protuberances having cutting edges 4 and 4' on the opposite lateral edges thereof, and a plurality of triangular small cutting blades 3 and 3' having cutting edges 5, 5', 6, and 6' extending from the apex of the triangle, wherein the apexes at the intersections between the cutting edges 5 and 6 or 5' and 6' are maintained on the circumference of a circle whose radius is smaller than that of the concentric circle of the outer peripheral edge 7 of the large cutting blades 2, the respective pluralities of small cutting blades 3 and 3' are arranged in series between the large cutting blades 2, and a series of the small cutting blades 3 and a series of the small cutting blades 3' are opposed to each other. The character a denotes the length of the outer peripheral edge 7 of the large cutting blade 2; the character c denotes the difference in radius between the concentric circles of the outer peripheral edges 7 and the tips of the small cutting blades; and the characters b and b' denote the respective lengths of the series of small cutting blades 3 and 3'. When mowing is performed with the mowing cutter formed in the manner described above, since there are grits or other hard substances or their particles scattered around and sticking to the rhizomes of grass and shrubs, the cutting edges are inevitably in contact with these hard substances during mowing. In other words, when the mowing rotary sawtoothed cutter is used, the cutting edges around the outer periphery of the mowing cutter will always be in contact with hard foreign substances fixed in the ground, e.g. embedded stones, masses of concrete, empty juice cans, iron fragments, and grits, or even if they do not contact these substances, they are in contact with hard fine particles sticking to the rhizomes or with small grits or hard fine particles isolated from the rhizomes owing to shocks imparted to the rhizomes by the mowing cutter during mowing, thus, the mowing cutter is wearing. In other words, these hard fine particles and grits are always in sliding contact with the upper and lower surfaces of the mowing cutter rotating at high speed, thus causing the mowing cutter to wear. The portion of the outer periphery of the mowing cutter which is the front surface for mowing action and the tips of the small cutting blades are subjected to particularly severe wear. The mowing cutter is rotating at high speed in the presence of these hard substances, and damage to the mowing cutter due to shocks or wear due to contact with these hard substances is far larger than wear of the mowing cutter due to mowing grass and shrubs. In other words, according to the theory of cutting concerning wear of mowing cutters, wear of the cutter due to mowing grass and shrubs is negligibly small, and the main cause is damage or wear due to contact with hard substances. This is a major difference in usage which cannot be found in any other cutters and mechanical tools. In conclusion, the mowing rotary sawtoothed cutter is cutting soft grass and shrubs while in contact with hard substances which are harder than the cutter itself. When the cutter is mowing in the direction of arrow R, its wear due to hard substances occurs in the following manner: Tangential wear of the outer peripheral edges 7 and the tips of the cutting edges of the large cutting blades 2 and small cutting blades 3 and 3' is such that wear of the large cutting blade 2 is great in the front tip of the cutting edge 4 and decreases toward the rear, wear of the outer peripheral edge 7 is greatest in the front portion A and decreases toward the rear region A' and so is wear of the small cutting edges 5 and 6', while normal wear of the tips of the cutting edges 4, 5, and 6', with the cutter rotating in the R direction, increases from the proximal side B toward the outer periphery A side. FIGS. 2A and 2B are views showing changes in wear and sharpening of the cutting edges 4, 4',5, 5', 6 and 6' of the mowing cutter of FIG. 1 when the mowing cutter is used in its turned-over state, a fact which is an outstanding feature of the present invention in usage. FIG. 2A shows wear of the cutting edges 4, 4', 5, 5', 6 and 6' of the mowing cutter of FIG. 1 used in the R direction, and FIG. 2B shows the result of the mowing cutter being used in the R' direction in its turned-over state after it was used in the R direction. Portions shown in dotted lines in FIGS. 2A and 2B represent the states that exist just before use in the respective directions. FIG. 3 shows sharpening and wear of the cutting edges due to hard fine particles on the upper and lower surfaces of the mowing cutter during mowing grass and shrubs. The mowing cutter of the present invention is designed so that at the same time as the cutting edges on one side perform mowing, the cutting edges on the other side are sharpened, thereby allowing turned-over use of the mowing cutter several times in succession, thus the use-life without manual sharpening is greater than 10 times that of a conventional cutter.

In the cutter of the present invention shown in FIG. 1 for exclusive use for mowing grass, unlike the one shown in FIG. 6 for exclusive use for cutting trees, damage to the cutting edges due to contact with hard substances would be severe, and in order to prevent this, the outer peripheral edges 7 of the large cutting blades 2 is made larger in diameter than the tips of the small cutting blades 3 and 3' to prevent hard substances from flying to the cutting edges of the small cutting blades. As a result, though damage to the large cutting blades is severe, the cutting edges of the small cutting blades which are the main cutting blades, are protected. When the mowing cutter with its cutting edges 4 and 5 on one side damaged owing to use in the R direction is used in the R' direction, grass and shrubs are cut by the cutting edges 4' of the large cutting blades 2, by the cutting edges 5' of the small cutting blades 3', and by the cutting edges 6 of the small cutting blades 3. Although the dust, small stones and grits that were not pushed outwardly of the mowing cutter by the outer peripheral edges 7 of the large cutting blades 2 and remained unremoved, probably fly in between the large cutting blades, they are pushed out by the cutting edges 6 of the small cutting blades 3, thus, hard substances are prevented from contacting the cutting edges 5'. In this case, since the cutting edges 6 are inclined away from the direction of rotation of the mowing cutter, the damage is slight. Further, since wear due to fine particles passing through the cutting edges 6, according to the aforesaid theory of wear, is great on the side toward the R' direction in which the mowing cutter is rotating and is less on the side toward the R direction, wear takes place as shown in FIG. 2B, and as a result, the edges are sharpened. FIG. 3 shows sharpening due to wear of the upper and lower surfaces of the mowing cutter, and this wear, coupled with the aforesaid plane wear, results in the tips of the cutting blades of the mowing cutter being sharpened to a great degree by a flow of fine particles.

The strength and safety of the mowing cutter during mowing operation are closely related to the sharpness and use-life, and they depend on the number of outer peripheral edges and cutting edges. The relation is such that the longer the outer peripheral edges and the less the number of cutting edges, the greater are the use-life, strength and safety, but reversely, the shorter the outer peripheral edges and the larger the number of cutting edges, the less are the use-life and strength as well as safety but the better the sharpness. The unparalleled durability of the mowing cutter of the present invention, namely possibility of using for a long period of time without manual sharpening, as well as its sharpness, strength, and safety is based on the fact that outer peripheral lengths b and b' comprising series of small cutting blades 3 and 3' having the cutting edges 6 and 6' also in the back are present in opposed relation to each other. That is, in the case of cutting operation in the rotative direction R, since the cutting edges 6' in the back of the small cutting blades 3' in b' are inclined away from the rotative direction R, they push out hard substances to prevent damage of the cutting edges 5 facing in the rotative direction R, and only soft grass and shrubs are cut by the cutting edges 5 and 4 and by the cutting edges 6' in the back. Thus, in this case, the portions b and b' are part of the outer peripheral edge with respect to hard substances and the back portions of the small cutting blades are the cutting edges 6 and 6' with respect to grass and shrubs and cut grass and shrubs. Accordingly, the cutting quality is the same as that of a sharp mowing cutter having a short outer peripheral edge. In addition, while the cutting edges 4, 5 and 6' facing in the R direction are cutting grass and shrubs, the tips of the cutting edges 4', 5' and 6 on the other side are being sharpened by hard fine particles, as described with reference to FIG. 3. When the cutting quality in the R direction is deteriorated, this mowing rotary cutter is turned over and the cutting edges 4', 5' and 6 are used for cutting grass and shrubs, while the cutting edges 4, 5 and 6' are being sharpened by hard fine substances. Similarly, when the cutting quality in the R' direction is deteriorated, the mowing rotary cutter is turned over again so that the cutting edges 4, 5 and 6' which have restored their cutting quality by the sharpening action automatically performed during the preceding mowing operation are used for cutting in the R direction. In the present invention in which the cutting edges on the other side restore their cutting quality by the sharpening action automatically performed during mowing operation and the mowing rotary cutter is repeatedly used, the cutter can be repeatedly used several times, and the use-life of the present cutter without seperate sharpening operation is greater than 10 times that of a conventional cutter. Thus, the invention has realized the user's long-standing desire for a mowing rotary cutter which cuts well for a long period of time without sharpening and which is safe.

This is based on the unique nature of the present invention that the mowing cutter presents a long outer peripheral edge with respect to hard substances but that with respect to grass and shrubs it presents a short outer peripheral edge and many cutting edges to perform mowing.

The above-mentioned theory is also applicable to a mowing rotary cutter wherein the cutting edges are in the form of a cemented carbide edge material such as chip or the like welded in position. FIGS. 7A and 7B show an embodiment of the cutter of the invention for cutting trees and mowing grass and shrubs, wherein cemented carbide chips 8 and 8' are welded in position to serve as cutting edges.

Figure 4:
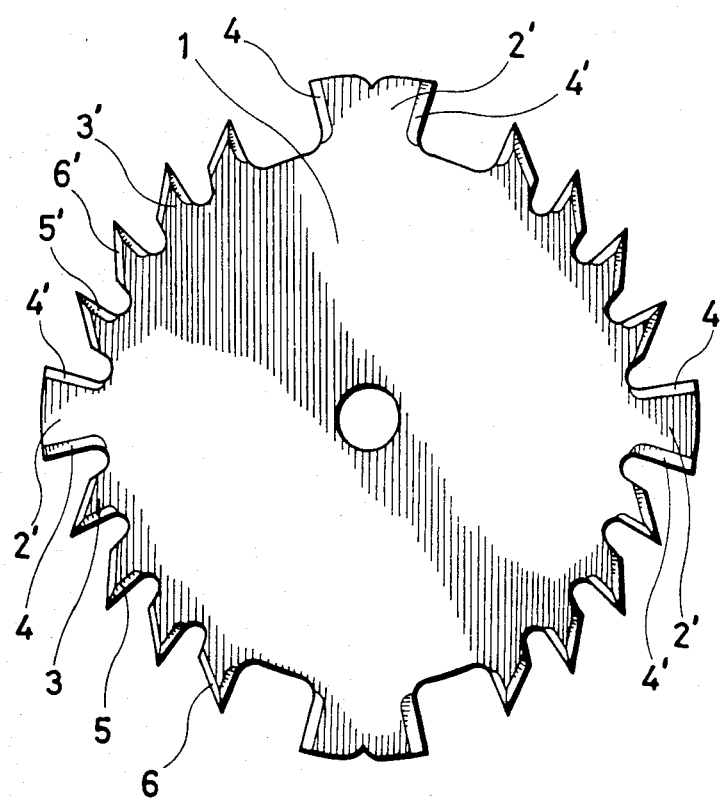
FIGS. 4 and 5 are plan views showing other embodiments of cutter of the invention for exclusive use for mowing grass.
Figure 5:
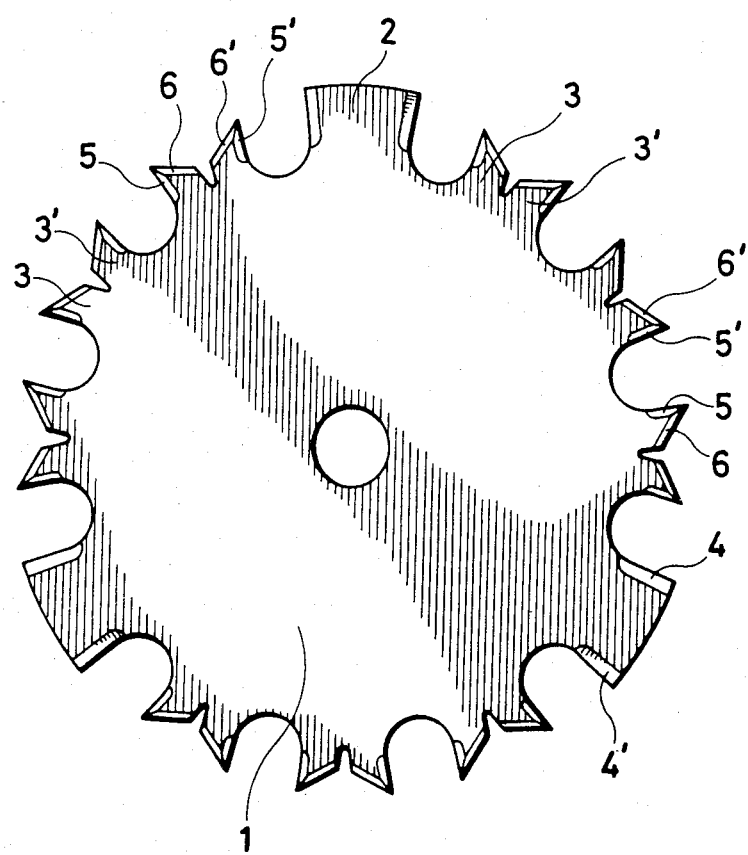

FIGS. 4, 5 and 8 show cutters for exclusive use for mowing grass according to the present invention. In the present invention, as shown in FIG. 5, it is also possible to pair the small cutting blade 3 and the small cutting blade 3' in opposed relation and to arrange pairs of the blades 3 and 3'.

Figure 6A:
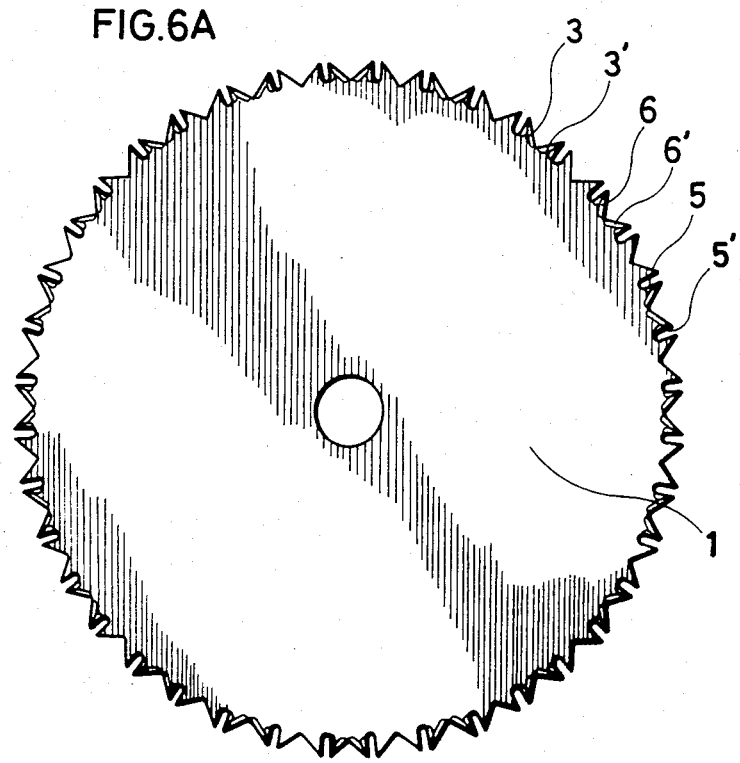
FIG. 6A is a plan view of another embodiment of a cutter of the invention for exclusive use for cutting trees.
Figure 6B:
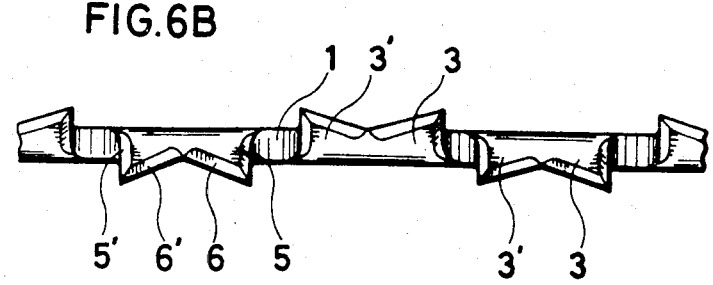
FIG. 6B is a side view of the cutter showing the cutting edges.

FIGS. 6A and 6B show a still another embodiment of the cutter of the present invention. This cutter is for exclusive use for cutting trees. In the case of a cutter for exclusive use for cutting trees, the large cutting blades 2 are not required because no hard substances are present. A large number of the small cutting blades 3 and 3' are arranged in opposed relation with respect to a pair of the blades 3 and 3'. In this case, too, the cutting edges positioned in the back side with respect to the rotating direction of the cutter are sharpened by sawdust in the same manner according to the before-mentioned theory.

Although the invention has been described in its preferred embodiments, it is to be understood that the invention is not limited thereto and that various changes and modifications may be made without departing from the spirit and scope of the invention.

What is claimed is:

1. A moving rotary sawtoothed cutter comprising:
   a disk made of a chemically synthesized material or steel having a central hole;
   a suitable number of large cutting blades disposed around the periphery of said disk, each blade having cutting edges on both lateral sides thereof and an intervening arc-shaped outer periphery; and a suitable number of triangular small cutting blades disposed in opposite relation to each other between said large cutting blades, each blade having cutting edges extending from the apex of the triangle along the opposite lateral edges thereof, said small blades having their apexes falling on the circumference of a circle concentric with a circle the circumference of which falls on the outer periphery of the large cutting blades.

2. The cutter of claim 1, wherein said cutting edges are made of cemented carbide of a suitable shape.

3. A mowing rotary sawtoothed cutter as claimed in claim 1 wherein said small blades are disposed in at least two series of blades extending around the periphery of said cutter, the blades of each series being in opposed relationship to the blades of another series.

4. A mowing rotary sawtoothed cutter as claimed in claim 1 wherein all of the apexes of said small blades fall on the circumference of a concentric circle smaller in diameter than the circumference of said cutter.

5. A mowing rotary sawtoothed cutter comprising:
   a disk made of a chemically synthesized material or steel having a central hole;
   and a suitable number of pairs of cutter blades disposed around the outer periphery of said disk, each pair having triangular small cutting blades, disposed in opposed relation to each other, each blade having cutting edges extending from the apex of the triangle along the opposite lateral edges thereof, each of the apexes of the small cutting blades falling on the circumference of a circle having its center at the center of said rotary cutter.

* * * * *